Jan. 4, 1944.　　　A. R. JOHNSON　　　2,338,116
MILLING MACHINE
Filed Nov. 19, 1942　　　3 Sheets-Sheet 1

INVENTOR
ARCHIE RAY JOHNSON.
BY
ATTORNEYS

Jan. 4, 1944. A. R. JOHNSON 2,338,116
MILLING MACHINE
Filed Nov. 19, 1942 3 Sheets-Sheet 2

INVENTOR
ARCHIE RAY JOHNSON.
BY
ATTORNEYS

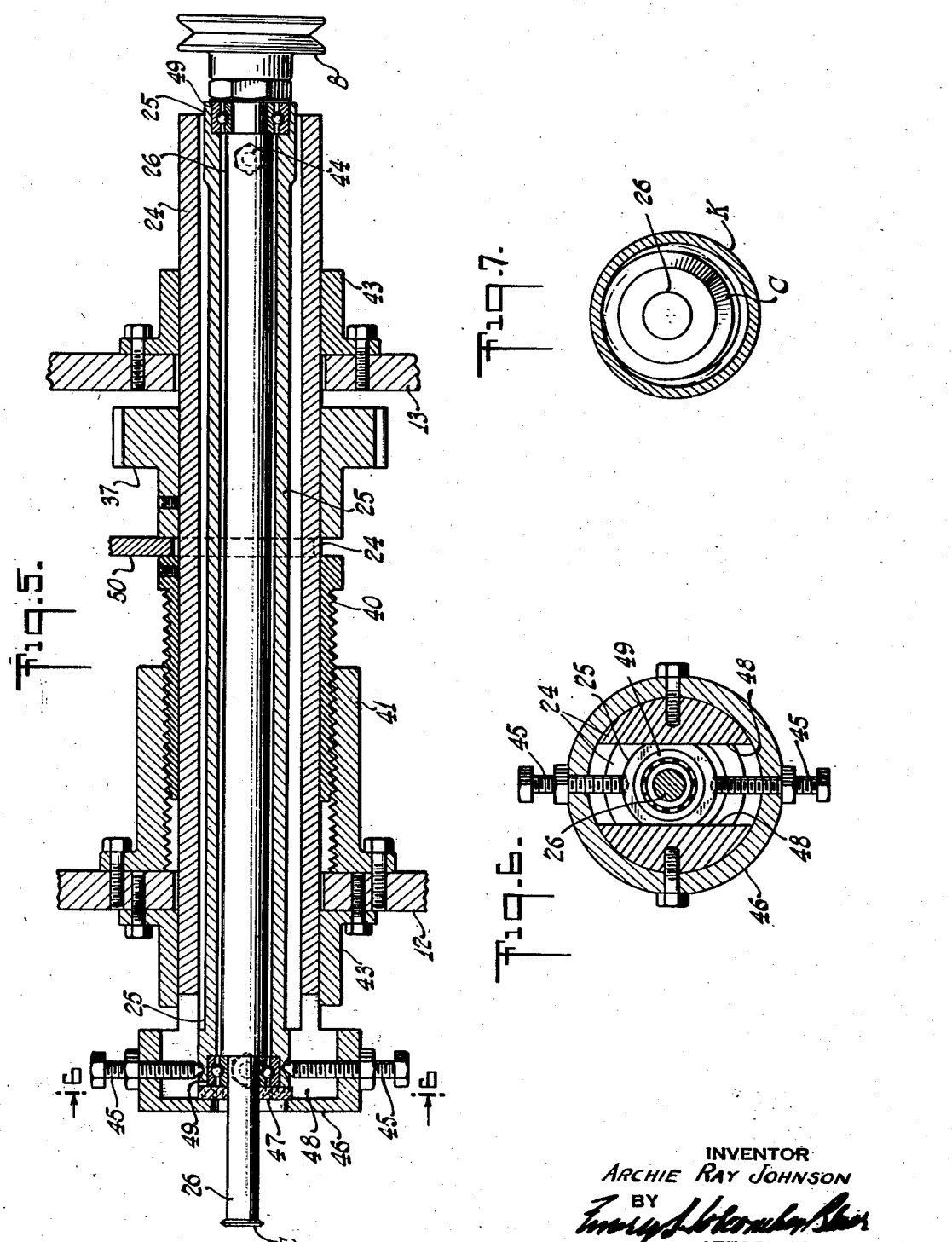

Patented Jan. 4, 1944

2,338,116

UNITED STATES PATENT OFFICE 2,338,116

MILLING MACHINE

Archie Ray Johnson, Brandon, Vt., assignor by mesne assignments, to Xylon Closure Corporation, New York, N. Y., a corporation of New York Application November 19, 1942, Serial No. 466,179

4 Claims. (Cl. 10—154)

This invention relates to milling machines and more specifically, to milling machines wherein the milling cutter is movable through a predeterminable path. The invention will be described as it may be applied to a milling machine for cutting a screw thread inside of a wooden cap for a bottle, such as a whisky bottle; the application of the invention to other uses will be apparent, however.

At the present time there is a great demand for new machines and methods which will enable the use of plentiful materials, such as wood, in the place of relatively scarce materials, such as iron, steel, and plastics. One instance is found in the search for a practical substitute for metal or plastic caps for whisky bottles. The use of wood seems an obvious expedient. Experimentation, however, has developed the fact that a cap which is sufficiently strong to permit of being internally threaded by a screw tap necessarily is of such heavy gauge, or thickness, that it presents an unattractive appearance when applied to a bottle. Exhaustive efforts have been made to combine a sufficiently strong screw thread within a cap light enough in weight to present a marketable appearance. So great has this demand been that many thousands of wooden caps have been turned out individually on a lathe in an attempt to find some practicable method of supplying a suitable substitute for the conventional steel caps.

The present invention stems from an appreciation that a suitable wooden cap might be manufactured by a milling process if the proper milling machine could be found. It was believed that a wooden blank, or turning, of marketable size and appearance was strong enough to withstand a thread milling operation, without crushing or splitting, where the same cap was utterly impractical when subjected to a screw tapping operation. No suitable milling machine was known to the art, however, and the apparatus herein described, capable of driving a milling cutter through a cylindrical, spiral path such as is useful in milling an internal thread, was ultimately invented and has enabled large scale production of the first practical wooden caps for whisky bottles.

It is an object of the present invention to provide a practical milling machine suitable for milling a screw thread inside of a wooden cap for a whisky bottle. A further object of the invention is the provision of a milling machine wherein the milling cutter may be moved through a predeterminable path. Another object is the provision of a milling machine having a milling cutter simultaneously movable through two components of rotation and one component of translation wherein the various components may be adjusted to meet the demands of a given situation. Further objects will be in part pointed out as the description proceeds and will in part become apparent therefrom.

The invention accordingly consists in the features of construction, combinations of elements, methods of production, and arrangements of parts as will be hereinafter set forth, and the scope of the application of which will be delineated in the appended claims.

In the accompanying drawings, in which an exemplary embodiment for achieving the above objectives is set forth and in which like reference characters refer to like parts:

Figure 5 is a sectional elevation through the milling unit of the machine;

Figure 6 is a sectional elevation taken along the line 6—6 of Figure 5 in the direction of the arrows; and Figure 7 is an elevation, partly in section, through a wooden cap and showing the milling cutter in operative position cutting a screw thread.

Figure 1:
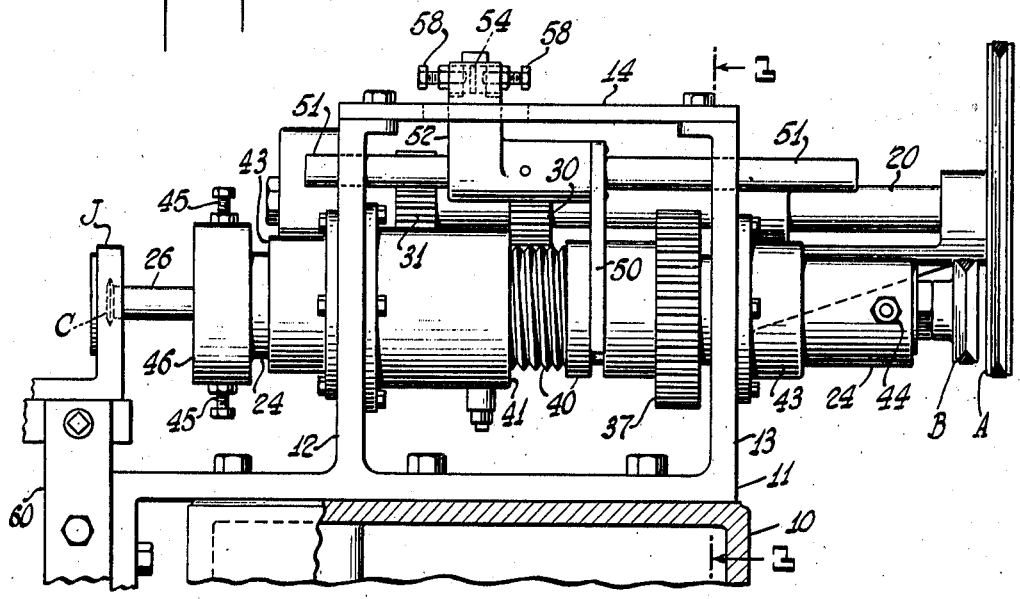
Figure 1 is a side elevation of the milling machine.

Described in general terms, the milling machine comprises a milling unit consisting of three substantially, but not literally, coaxial shafts. The central one of these three shafts is driven at a relatively high speed, for example 5,000 revolutions per minute, and carries on one end the milling cutter. This inner high speed shaft, or milling cutter shaft, is carried in ball bearings within an intermediate, or mounting, shaft. The mounting shaft in turn is carried inside of an outer, or feeding, shaft. The mounting shaft is pivotally suspended within the feeding shaft at one end, and is eccentrically movable with respect to the feeding shaft by adjustable means located at the other end. The feeding shaft is provided on a portion of its outer surface with lead screw means so that as it is rotated at a relatively low speed, for example 100 revolutions per minute, it may be advanced or retracted axially, depending upon the direction of rotation.

Hence, by rotating the feeding shaft the milling cutter is moved with an axial or translatory component so that it may be fed into and backed out of a wooden cap. Simultaneously, the adjustable means which controls the eccentricity of one end of the mounting shaft with respect to the feeding shaft permits the axis of rotation of the milling cutter to be set at a slight angle with respect to the axis of rotation of the feeding shaft so that the cutter itself describes a circular path having a radius equal to the eccentric adjustment given to the mounting shaft. This eccentric adjustment provides for one component of rotation whereby the diameter of the path followed by the milling cutter may be varied in order to adapt the machine to mill threads in caps of varying diameter. The speed of rotation of the milling cutter shaft may be adjusted through various known means, as will be described hereinafter, to accommodate the cutter speed to the various conditions encountered. This variation in cutter speed affords an adjustment to a second rotational component of the milling cutter.

The machine disclosed is mounted upon a pedestal 10 and comprises a casting 11 including a front supporting plate 12, a rear supporting plate 13 and a cover 14. The various shafts of the machine are supported by plates 12 and 13 and extend therebetween.

Figure 2:
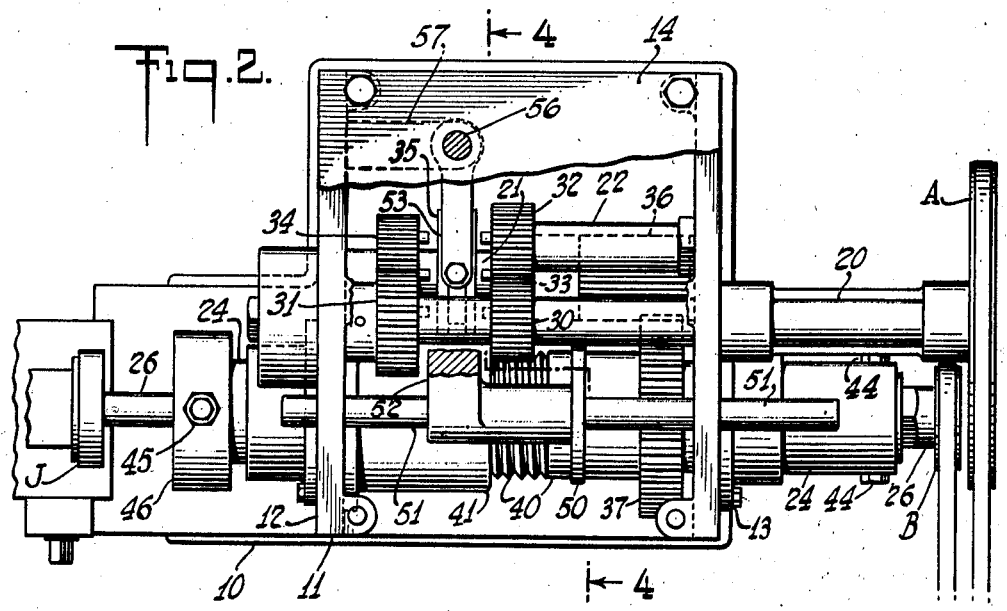
Figure 2 is a plan view with parts broken away and parts in section, of the machine illustrated in Figure 1.

Referring to Figures 1 and 2, pulleys indicated by A and B are illustrated. These pulleys are belt-driven from a source of power such as an electric motor. Pulley A drives a shaft 20 which, through intermediate gearing and a clutch mechanism to be described, affords rotation of a feeding shaft 24 to feed a milling cutter C into and out of a wooden cap. Pulley B drives a milling cutter shaft 26 which extends directly through the machine to drive milling cutter C, shown in Figure 1.

Figure 3:
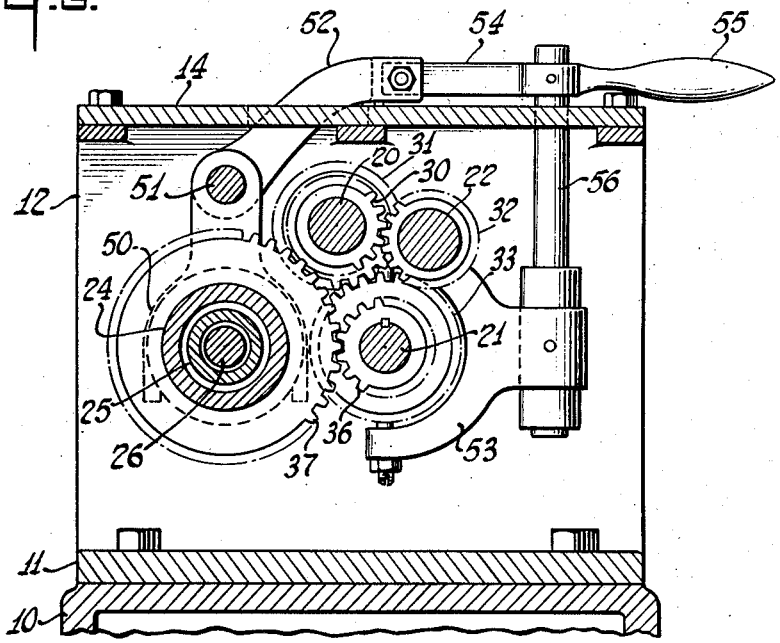
Figure 3 is a sectional elevation taken along the line 3—3 of Figure 1 in the direction of the arrows.
Figure 4:
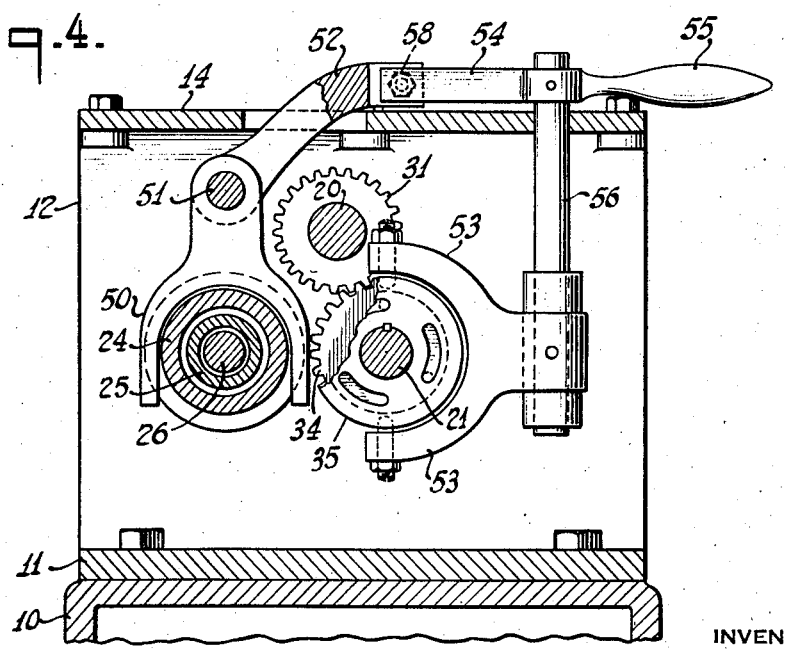
Figure 4 is a sectional elevation taken along the broken line 4—4 in Figure 2 in the direction of the arrows.

Pulley shaft 20 carries a pulley shaft feeding gear 30 and a pulley shaft reversing gear 31 (Figures 1 and 2). Gear 30 meshes with an idler gear 32 running freely upon a stud shaft 22 (see Figures 2 and 3). Gear 32 meshes with a feeding gear 33 (see Figure 3) which is freely mounted on a clutch shaft 21. Reversing gear 31 meshes with a reversing gear 34 freely carried by clutch shaft 21 (see Figure 4).

A clutch plate 35 (see Figures 2 and 4) is splined to the clutch shaft and is movable into clutching engagement either with gear 33 or gear 34, depending upon whether the milling cutter is to be fed into or backed out of a cap. Also mounted on clutch shaft 21 is a driving gear 36 meshing with a feeding shaft gear 37 solid with feeding shaft 24 (see Figure 5). Feeding shaft 24 is carried in sleeve bearings 43 mounted in supporting plates 12 and 13. Shaft 24 is provided with a replaceable lead screw sleeve 40 which is threaded into a lead screw flange 41 bolted to plate 12. As shaft 24 is rotated by gear 37, it moves either to the right or to the left, as viewed in Figure 5, depending upon the direction of rotation. Gear 36 is sufficiently wide that meshing gear 37 can slide therealong as the feeding shaft moves the milling cutter into and out of successive caps.

Within feeding shaft 24 (see Figure 5) is the intermediate mounting shaft 25 and within mounting shaft 25 is the inner milling cutter shaft 26. Shaft 25 at its right-hand end, as viewed in Figure 5, is pivotally supported as between pivot screws 44 (also see Figures 1 and 2). At its left-hand end shaft 25 is movable by means of set screws 45 eccentrically with respect to shaft 24 within a guideway 48 formed in the end of shaft 24 (see Figure 6). Set screws 45 are threaded into and carried by a cap 46 (see Figures 1, 2, and 5) which is bolted to the left-hand end of feeding shaft 24 (see Figure 6). Hence the machine may readily be set by a single adjustment to set screws 45 for milling a thread within a cap of any diameter ordinarily encountered.

Milling cutter shaft 26 is carried in ball bearings 49 within each end of mounting shaft 25. The left-hand ball bearing 49 is sealed by means of a felt washer 47 between the ball bearing and an opening in cap 46, within which opening the milling cutter shaft moves under the control of set screws 45. The belt drive at pulley B permits movement of the pulley back and forth under control of the feeding screw without loss of power. By using pulleys of different diameters the speed at which the milling cutter shaft is rotated may be varied without altering the speed of the driving motor or of pulley A.

Feeding shaft gear 37 and lead screw 40 are solidly fastened to feeding shaft 24 preferably as by means of screws, rather than by a key or spline, to promote ease of assembly and disassembly when changing the feeding screw sleeve and flange to give threads of different pitch.

Between sleeve 40 and gear 37 a feed follower 50 is positioned. Follower 50 is rigidly attached to a follower shaft 51 (see Figure 1) slidably carried in plates 12 and 13. Shaft 51 carries a follower arm 52 (see Figures 3 and 4) which serves to disengage the clutch at the end of each feeding or reversing operation. Clutch plate 35 is carried by a yoke 53 which in turn is positioned upon a control shaft 56 mounted in a bracket 57 (see Figure 2) and extending upwardly to carry a clutch control lever 54 and a clutch control handle 55. Lever 54 is positioned within the limits of a bifurcated end of follower arm 52. Set screws 58 provide an adjustment to predetermined the points at which the clutch will be disengaged as follower arm 52 is advanced and retracted by follower 50 in response to movements of the feeding shaft. Handle 55 allows a manual control at any point during feeding or retraction and also enables the clutch to be engaged at the beginning of an operation after the clutch has been disengaged automatically by the follower mechanism. As illustrated, the follower mechanism serves only to disengage the clutch at the end of a feeding or backing out operation. Obviously, however, the clutch might be arranged to back out the milling cutter automatically if desired, rather than simply to interrupt an operation at the end of a travel.

A jig indicated by J (see Figures 1 and 2) is represented for rigidly holding a wooden cap, such as the cap K which is partly shown in Figure 7, coaxially with the feeding shaft during a milling operation. This jig is supported by a bracket 60 which in turn is bolted to an arm on casting 11. The details of the work holding jig are inconsequential in so far as the present invention is concerned, and any conventional means suited to production which will hold the cap rigidly in place while it is being acted upon by the milling cutter may satisfactorily be used.

The machine described herein is simple in operation and easily adjusted. The translatory component of milling cutter travel is readily controlled by means of set screws 58. The rotational component of the milling cutter which enables the cutter to follow the inner cylindrical surface of a cap may be adjusted by means of set screws 45 and the rotational component whereby the cutter itself is driven may be changed by changing driving pulley B. Furthermore, the pitch of the thread to be milled may be predetermined in accordance with the pitch selected in lead screw sleeve 40 and flange 41.

The invention has ben illustrated and described as it may be applied to one type of milling machine. In the embodiment herein disclosed various details and features have been exaggerated and distorted toward the end of more clearly presenting the inventive concept of the invention. The invention may be applied in various ways and the machine described will necessarily be subjected to modifications in order to adapt it to other uses. The invention is not to be limited, therefore, by anything in the specification or drawings, which are used only by way of illustration, but on the contrary is to be limited solely by the scope of the accompanying claims.

I claim:

1. In a milling machine adapted to cut a screw thread inside of a piece of work and having a milling cutter movable through a predetermined path; a feeding shaft for advancing the milling cutter into the piece of work, whereby the pitch of the thread may be determined; a mounting shaft located within said feeding shaft, said mounting shaft being pivotatlly supported adjacent one end within the feeding shaft and being eccentrically movable with respect to the feeding shaft adjacent its other end, whereby the diameter of the thread may be determined; and a milling cutter shaft rotatably positioned within said mounting shaft, whereby the milling cutter may be driven for cutting the thread.

2. In a milling machine adapted to cut a screw thread inside of a piece of work and having a milling cutter movable through a predetermined path: a feeding shaft for advancing the milling cutter into the piece of work, whereby the pitch of the thread may be determined; a mounting shaft located within said feeding shaft, said mounting shaft being pivotally supported adjacent one end within the feeding shaft and being eccentrically movable with respect to the feeding shaft adjacent its other end by means of adjustable set screws carried within said feeding shaft, whereby the diameter of the thread may be determined; and a milling cutter shaft rotatably positioned within said mounting shaft, whereby the milling cutter may be driven for cutting the thread.

3. In a milling machine adapted to cut a screw thread inside of a piece of work and having a milling cutter movable through a predetermined path: a feeding shaft for advancing the milling cutter into the piece of work and including replaceable lead screw means, said lead screw means comprising a collar adapted to be locked on said feeding shaft and a flange adapted to be locked on said machine, whereby the pitch of the thread may be determined; a mounting shaft located within said feeding shaft, said mounting shaft being pivotally supported adjacent one end within the feeding shaft and being eccentrically movable with respect to the feeding shaft adjacent its other end by means of adjustable set screws carried within said feeding shaft, whereby the diameter of the thread may be determined; and a milling cutter shaft rotatably positioned within said mounting shaft, whereby the milling cutter may be driven for cutting the thread.

4. In a milling machine adapted to cut a screw thread inside of a piece of work and having a milling cutter movable through a predetermined path: a feeding shaft for advancing the milling cutter into the piece of work and including replaceable lead screw means, said lead screw means comprising a collar adapted to be locked on said machine, whereby the pitch of the thread may be determined; a mounting shaft located within said feeding shaft, said mounting shaft being pivotally supported adjacent one end within the feeding shaft and being eccentrically movable with respect to the feeding shaft adjacent its other end by means of adjustable set screws carried by said feeding shaft, whereby the diameter of the thread may be determined; a clutch for reversing the feeding shaft and including adjustable means for predetermining automatic operation thereof, whereby the milling cutter may be backed out of the piece of work; and a milling cutter shaft rotatably positioned within said mounting shaft, whereby the milling cutter may be driven for cutting the thread.

ARCHIE RAY JOHNSON.